Jan. 20, 1970
W. K. FAIRCHILD
3,490,492
FLUID FLOW CONTROL MECHANISM
Filed Jan. 13, 1966
2 Sheets-Sheet 1
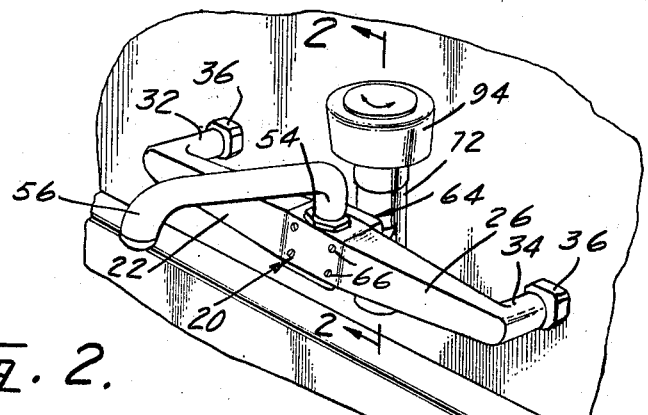
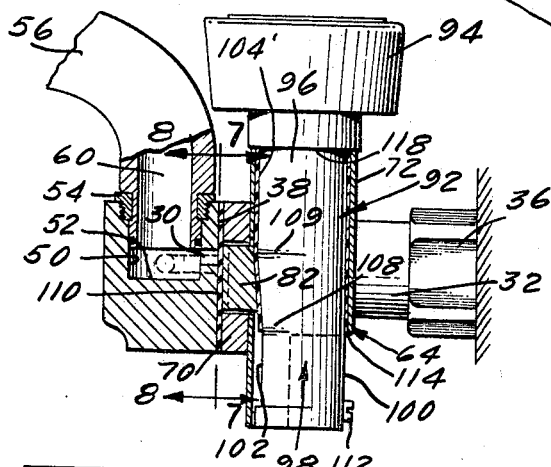
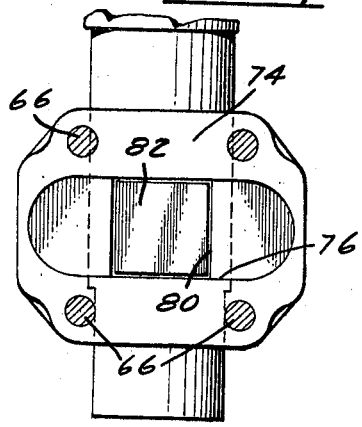
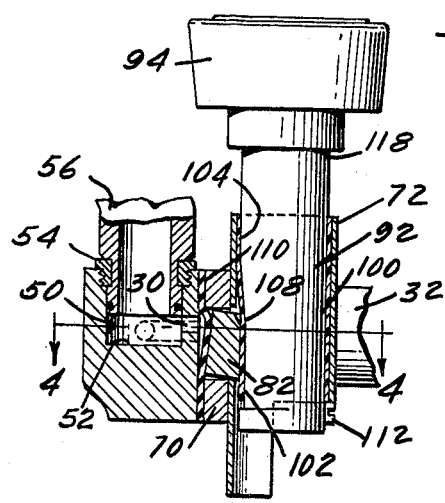
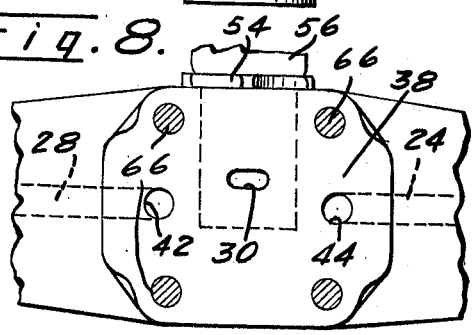
Wayne K. Fairchild,
INVENTOR.
BY
*[signature]*
Attorney

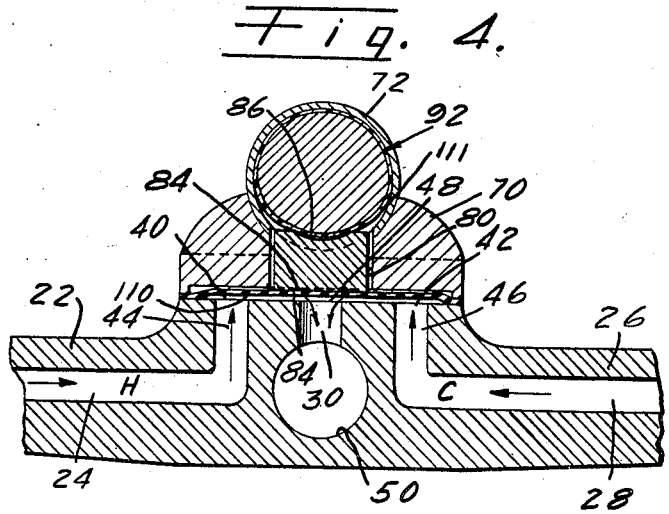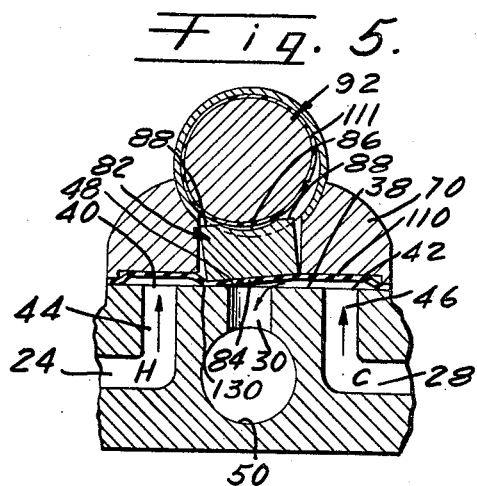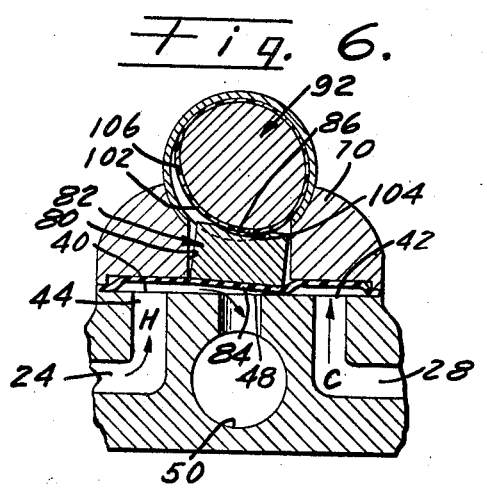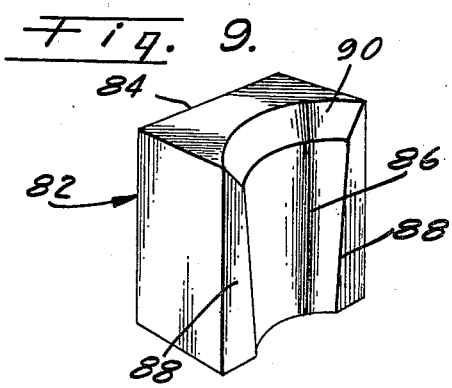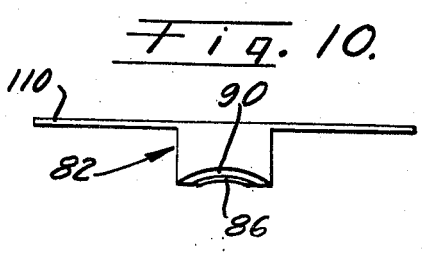

United States Patent Office 3,490,492
Patented Jan. 20, 1970

3,490,492
FLUID FLOW CONTROL MECHANISM
Wayne K. Fairchild, Torrance, Calif.
(1106 S. Pacific, Santa Ana, Calif. 92704)
Filed Jan. 13, 1966, Ser. No. 520,512
Int. Cl. F16k 11/00
U.S. Cl. 137—625.4
6 Claims

ABSTRACT OF THE DISCLOSURE

Fluid mixing and volume control apparatus for controlling the flow, mixing and discharge of hot and cold water, having a valve member and control means therefor to variously position the valve member to selectively vary the ratio of hot and cold water without varying the volume of water discharged, and to vary the volume discharged without varying the ratio, or simultaneously varying both the volume discharged and the ratio of hot and cold water discharged.

---

This invention relates generally to fluid flow control means and relates more particularly to a mixing valve for mixing various fluids.

While the invention has particular utility embodied in a mixing valve for hot and cold water, and is shown and described thus embodied, it is to be understood that its utility is not confined thereto.

As is well known, various problems are involved and difficulties encountered in the provision of a suitable trouble-free mixing valve for various types of installations, such as household sinks, bathroom wash basins, bathtubs, laundries, and the like. For example, one difficulty in some of the present types of mixing valves is the cross flow or bypassing of hot or cold water when the valve is in a closed position and no water is flowing from the spout. For example, in some present day valves there is this difficulty when the valve is in the closed position and the water pressure in the cold water line drops below the pressure in the hot water line. Such a condition may occur when water is being used in another part of the water system of the house, as when sprinklers are turned on. Hot water then flows or seeps across the control valve member and into the cold water line. Then when the faucet is opened there will be a flow of hot water from both lines until the hot water that seeped into the cold water line has been drawn off. When this occurs there is not only the inconvenience of waiting until the hot water has been emptied from the cold water line, but there is also a waste of water. Such seepage can also occur from the cold to the hot water line should pressure be reduced in the hot water line with the valve closed.

It is therefore an object of the present invention to provide a control valve mechanism which will solve this problem and eliminate the difficulty involved.

It is another object of the invention to provide a valve mechanism of this character wherein the cross flow or seepage between the hot and cold water lines is eliminated.

Still another object of the invention is to provide a valve mechanism of this character having a minimum number of parts.

A further object of the invention is to provide a valve mechanism of this character having a single actuating member.

It is a still further object of the invention to provide mechanism of this character having a minimum number of moving parts.

It is another object of the invention to provide mechanism of this character wherein the actuating member is operable to vary the volume of flow when actuated axially and is operable to vary the temperature when rotated on its axis.

Still another object of the invention is to provide mechanism of this character having a wobble element or block controlling the water ports for controlling the temperature of the water as well as the volume of flow from the spout.

A further object of the invention is to provide mechanism of this character wherein the volume can be maintained constant for any given volume setting when the temperature of the water delivered from the spout is changed. Also the volume of flow can be changed for any given temperature position.

It is a still further object of the invention to provide mechanism of this character that is extremely simple in construction.

Another object of the invention is to provide mechanism of this character that is simple and reliable in operation.

Still another object of the invention is to provide mechanism of this character that is relatively easy to assemble and to disassemble.

A further object of the invention is to provide mechanism of this character that is easy and simple to service.

It is a still further object of the invention to provide mechanism of this character that may be easily and quickly attached to the outlets of a sink, bathtub, or the like, and may be readily detached therefrom if need be.

The characteristics and advantages of the invention are further sufficiently referred to in connection with the following detailed description of the accompanying drawings, which represent certain embodiments. After considering these examples, skilled persons will understand that variations may be made without departing from the principles disclosed and I contemplate the employment of any structures, arrangements or modes of operation that are properly within the scope of the appended claims.

Referring to the drawings, which are for illustrative purposes only:

FIG. 1 is a perspective view of valve mechanism embodying the present invention attached to the outlets of the hot and cold water lines;

FIG. 2 is an enlarged sectional view taken on line 2—2 of FIG. 1 showing the mechanism in the closed position;

FIG. 3 is a view similar to FIG. 2 but showing the mechanism in the fully open position with both hot and cold water being admitted equally;

FIG. 4 is an enlarged sectional view taken on line 4—4 of FIG. 3;

FIG. 5 is a view similar to that of FIG. 4 but showing the mechanism positioned for full flow of water from one of the water lines;

FIG. 6 is a similar view showing the mechanism positioned for full flow of water from the other water line;

FIG. 7 is an enlarged sectional view taken on line 7—7 of FIG. 2;

FIG. 8 is an enlarged sectional view taken on line 8—8 of FIG. 2;

FIG. 9 is an enlarged perspective view of the wobble element or block; and

FIG. 10 is a view of an alternative arrangement wherein the block and diaphragm are integral.

Referring more particularly to FIG. 1 there is shown a fluid control mechanism or mixing valve embodying the present invention, said mechanism comprising a body, indicated generally at 20, having a hot water conduit 22 with a hot water passage 24 therethrough, and a cold water conduit 26 with a cold water passage 28 therethrough, conduits 22 and 26 extending in opposite directions from the body 20. There is also an outlet passage 30 in said body.

Hot and cold water conduits 22 and 26 have laterally turned free end portions 32 and 34 respectively which have means, including nuts 36, for attaching same to hot and cold water lines for a kitchen sink, bathtub, wash basin or the like. The means for securing the conduits to the water lines is well known and need not be described in detail.

Body 20 has a flat rear side 38 with hot and cold water ports 40 and 42 respectively, said ports being connected with the hot and cold water passages 24 and 28 by passage portions 44 and 46 respectively. There is also an outlet port 48 positioned intermediate the hot and cold water ports 40 and 42 and above a line through the centers of said ports 40 and 42 as best shown in FIGS. 4, 5, 6 and 8.

Outlet port 48 is connected with a generally vertical bore 50 at the front of the body by the outlet passage 30, said bore being open at the top and closed at the bottom by a wall 52. At the upper end bore 50 has a tapped portion 54 for engagement by a nut 56 of a spout 58 whereby said spout is operably attached to the body with the outlet or discharge passage 60 of said spout communicating with the lower end portion of bore 50 which receives water from the outlet passage 30.

A housing for the operating parts of the mechanism is indicated generally at 64 and is removably attached to the body 20 by screws 66 received in openings provided therefor in a front part 70 of the housing and secured in tapped bores 68 in the body 20.

The housing also includes a tubular part 72 at the rear of the front part 70, the front face or side of the latter being flat, as indicated at 74 to correspond with the flat side 38 of the body 20, and said front side 74 has an elongated, longitudinally extending recess 76 therein. This recess overlies the ports 40, 42, and 48 of the body 20.

Tubular part 72 of the housing is vertically disposed, as shown in the drawings, and there is an opening 80 which extends from the bottom or closed side of the recess 76 into the tubular parts 72. As shown this opening is square in cross section and operably receives a correspondingly shaped block, indicated generally at 82. This block may also be termed a movable valve member.

Block 82 is smaller than the opening 80 so that said block may wobble or tilt therein, as shown in the drawings and described more particularly hereinafter. What will be termed the front face 84 of block 82 is flat. At the rear side said block has a central rear face portion 86 that extends vertically and is concave in cross section. Further, this face portion 86 tapers forwardly from the bottom and the block has rear edge parts 88 at the sides of the concave, tapered face 86, said rear edge parts being in a plane parallel to the front face 84. From the top end of the rear face portion 86 there is an upwardly and forwardly inclined arcuate part 90.

Slidable within the tubular part 72 of the housing is a control member, indicated generally at 92, said control member being shown as a manually operated part and includes a knob or handle 94 at the upper end.

Control member 92 comprises a top cylindrical part 96 which has the knob 94, and a lower cam portion or part 98. At the back the cam part is semi-cylindrical with the same radius as the top part 96. This semi-cylindrical part will be termed the back 100 of the cam part of the control member. The front part of the cam has a lower cam portion including a longitudinally extending central part 102 which is spaced inwardly of the plane of the cylindrical interior passage 104' of the tubular part 72 so that said cam part 102 is closer to the axis of the control member than the back 100 of said cam. This central part 102 of the cam is also parallel to the axis of the control member 92.

From this central part of the cam the surface of said cam extends in opposite directions arcuately and outwardly as indicated at 104 and 106 respectively to merge with the semi-cylindrical back 100. The upper ends of the central part 102 and side cam parts 104 and 106 end at a common horizontal plane and from such upper ends the cam flares upwardly or is inclined upwardly and outwardly at 108 relative to the axis of the control member to merge at the upper end with the lower end of the cylindrical part 96 of said control member, as at 109 in FIG. 2. The inclination of said part 108 is the same as the inclination of the face 86 of the block 82, said face 82 being engageable with the inclined part 108 of the control member under certain conditions described hereinafter.

When the mechanism is assembled the block 82 is operably disposed in the opening 80 of the front part 70 of the housing 64 and there is a flexible diaphragm 110 of any suitable material such as rubber, natural or synthetic, plastic or the like, disposed between the front face 38 of the body 20 and the rear face 70 of the front housing part 70. This diaphragm is securely clamped between these parts by the screws 68. The recess 76 is deep enough so that its walls together with the diaphragm, provide fluid flow passages between the inlet ports and the outlet port. The pressure of water from the inlet ports against said diaphragm urges same away from the ports and urges the block in the same direction.

A friction reducing sleeve of a suitable plastic material, such as "Teflon" for example is disposed in the tubular part 72 and the control member is operably movable in said sleeve. "Teflon" is the registered trademark of Du Pont for its fluorocarbon resins, including the TFE (tetrafluorethylene) resins. This sleeve is elastic and resilient enough to allow free operative movements of the parts of the mechanism.

It is to be understood that the mechanism will function properly without this sleeve, the control member then being of such size as to operably fit in the tubular part without said sleeve 111. In order to simplify the description of the operation of the mechanism said sleeve 111 will be ignored since the mechanism functions properly without the sleeve as well as with it.

The mechanism is in the fully closed position, best shown in FIGS. 1 and 2, when the control member 92 is at its lower position. Upward movement of said control member 92 is limited by engagement of the head 112 of a screw in a tapped bore provided therefor adjacent the lower end of the control member with the upper end 114 of a notch 116 in the lower end of the tubular member 72.

The head 112 is adapted to move about in said notch 116 as the control member is moved upwardly and downwardly and rotated on its axis. Downward movement of the control member 92 in the tubular member 72 is limited by engagement of an annular shoulder 118 of the knob with the upper end of said tubular member.

Notch 116 is of sufficient extent annularly to permit rotation of the control member in both directions to fully open the hot water port 40 and simultaneously fully close the cold water port and vice versa. Rotational movement of the control member is limited by engagement of the head 112 of the limiting screw with respective end walls 120 of said notch 116.

As above described the valve mechanism is fully closed when the control member is at its downward limit of movement. At this time the curved face 86 of the block is disposed on the upwardly and outwardly inclined portion 108 of the control member, the forward flat face 84 of the block 82 then pressing flatly against the adjacent part of the diaphragm 110 forcing same tightly against the central portion of the face 38 of the body 20, that is, against the area thereof in which the outlet port 48 is located thus completely closing said port and preventing any fluid flow thereinto. This is best shown in FIG. 2.

Should the central part 102 of the lower cam portion be centrally located in the concave face 86 and the control member moved upwardly the block will move away from the plane of the face 74 of the part 70 of the housing and consequently permit pressure of water in the hot and cold water ports 40 and 42 to force said diaphragm away from the face 38 of the body 20 resulting in substantially equal amounts of hot and cold water to flow into the outflow port 48. The proportion of hot and cold water passing through the mechanism and into the outflow port 48 will remain constant throughout the entire volume control upward and downward movements of the control member 92. When the control member is at its upward limit of movement the mechanism is in the fully open position, as shown in FIG. 4, with maximum volume of fluid flowing therethrough.

In order to clearly describe the functioning of the mechanism relative to the control of the opening and closing of the hot and cold water ports and hence the temperature of the water discharged into the outflow port 48 and hence from the spout, the control member is shown in FIGS. 5 and 6 as in the uppermost position with the mechanism fully open.

Referring now to FIG. 5 the control member is shown as rotated to its limit of movement in the counter clockwise direction. As the control member begins to move in this direction cam part 106 engages the part 88 of the block at one side of the face 86. Since part 88 is parallel to the face 84 of the block it will cause the block to start to tilt and cause the adjacent front corner 130 to move toward the face 38 of the body 20. This will effect a cutting down of the flow of hot water from hot water port 40 and result in full cutting off of hot water when the control member has been rotated to its limit of movement in the clockwise direction as shown in FIG. 5. At the same time there is a full flow of cold water from the cold water port 42 into the outflow port 48 and hence from the spout.

Rotation of the control member in the clockwise direction will result in the full closing of the cold water port 42 and allow full flow of hot water through the mechanism for discharge from the spout.

With the above described cam arrangement of the control member and the shape and arrangement of the faces and parts of the block 82 the ratio or proportions of hot and cold water flowing through the mechanism, and hence the temperature of the water discharged therefrom, will remain constant with changes in volume when the control member is moved upwardly and downwardly without rotation of same. Also, for any given volume setting the temperature can be changed by appropriate rotation of the control member so long as said control member is not moved longitudinally.

In FIG. 10 there is shown an arrangement wherein the block and diaphragm are integral being formed of some suitable material, such as a plastic for example, which permits flexing of the diaphragm but is sufficiently stiff or hard for the block. The block in FIG. 10 is indicated by the reference numeral 82a and the diaphragm by the numeral 110a.

I claim:

1. In fluid flow control mechanism:
   (A) a body having a substantially flat side with a pair of inlet ports therein spaced apart from each other and an outlet port positioned generally between said inlet ports;
   (B) a flexible diaphragm overlying said ports and clamped against said flat side and providing, with the area about said ports, fluid passage means between said inlet ports and said outlet port;
   (C) a movable valve member operably mounted at the side of the diaphragm opposite the diaphragm side facing the flat side of the body, said valve member being aligned with the outlet port and having generally parallel side edges positioned between the outlet port and respective inlet ports,
      (a) means for moving said valve member being movable toward and away from said flat side for controlling the flow of fluid into said outlet port without changing the ratio of the flows from the two inlet ports,
      (b) said valve member also being tiltable,
   (D) means for tilting said valve member and when said valve member is tilted in one direction one of the edges of the valve member forces a part of said diaphragm toward the flat side of said body to control the flow of fluid from one of the inlet ports to the outlet port, and when said valve member is tilted in the opposite direction another part of said diaphragm is moved toward the flat side of said body to control the flow from the other inlet port to said outlet port.

2. The invention defined by claim 1 wherein the flexible diaphragm is clamped against the flat side of said body by a plate having an elongated recess therein aligned with said ports and there is a mounting and guide opening in said plate from said recess for said movable valve member, said opening providing access to said movable valve member from the outer side thereof and being sufficiently large to permit tilting, wobbling movements of said valve member.

3. The invention defined by claim 1 including a tubular part at the outer side of said plate, said opening communicating with the interior of said tubular part; and a control member having cam means thereon, said control member being slidably and rotatably disposed in said tubular part, said cam means of said control member engaging said movable valve means and effecting movement of said valve member toward the flat side of the body with longitudinal movement of said control member and effecting tilting of said valve member with rotary movements of said control member.

4. The invention defined by claim 1 wherein
   (A) the side of the movable valve member facing the diaphragm is flat and the opposite side has a groove normal to a plane through the inlet ports, said groove being concave in cross section and inclined from one end toward the other and outwardly relative to the flat face, there being side parts at the sides of said groove and parallel to the flat side of said valve member;
   (B) and the means for controlling the movements of said valve member comprises a control member mounted for slidable and rotatable movements, said control member having a pair of oppositely arranged cams for engagement with the inner side edges of the side parts of the outer side of the movable valve member for effecting tilting of said valve member with respective rotary movements of said control member, said control member also having a longitudinally and outwardly inclined cam extending from one end of said oppositely arranged cams and engageable with said groove of the movable valve member, the inclination of said outwardly inclined cam complementing the inclination of said groove.

5. In a fluid flow control mechanism:
   (A) a body having a pair of inlet ports spaced apart from each other and connected with respective conduits for fluid, and an outlet port positioned generally between said inlet ports and connected with a fluid outlet passage;
   (B) a flat flexible diaphragm overlying said ports and peripherally secured against a portion of said body to provide, with a portion of said body, fluid passage means between said inlet ports and said outlet port;
   (C) a movable valve member mounted at the side of said diaphragm opposite said body for movements of one type for controlling the flow of fluid into said outlet port without changing the ratio of the flows from the two inlet ports, and having movements of another type controlling the flow of fluid from respective inlet ports to said outlet ports, said diaphragm and block are integral;

(D) and means for moving said movable valve member to effect respective types of movement thereof.

6. In flow control mechanism:
(A) a body having a pair of inlet ports and an outlet port, said ports being spaced apart;
(B) passageway means between respective inlet ports and said outlet port, at least a portion of each of said passageway means being flexible;
(C) and a movable valve member operably mounted for movement for controlling the flow into said outlet port, and for rocking movement in opposite directions to control flow of fluid from respective inlet ports to said outlet port;
(D) and valve member control means operably mounted for longitudinal movement and for rotary movement, said valve member moving toward and away from the outlet port in accordance with longitudinal movements of said valve member control means, and said valve member rocking in accordance with rotary movements of said valve member operating means.

References Cited

UNITED STATES PATENTS

| | | | |
|---|---|---|---|
| 2,976,887 | 3/1961 | Wilson | 137—625.4 |
| 3,126,914 | 3/1964 | Dombre | 137—636 X |

FOREIGN PATENTS 511,989  10/1920  France.

M. CARY NELSON, Primary Examiner

M. O. STURM, Assistant Examiner